United States Patent
Linder et al.

(10) Patent No.: US 6,683,904 B2
(45) Date of Patent: Jan. 27, 2004

(54) RF TRANSCEIVER WITH LOW POWER CHIRP ACQUISITION MODE

(75) Inventors: Louis F. Linder, Agoura Hills, CA (US); Benjamin Felder, Saugus, CA (US); Don C. Devendorf, Carlsbad, CA (US)

(73) Assignee: Telasic Communications, Inc., El Segundo, CA (US)

( * ) Notice: Subject to any disclaimer, the term of this patent is extended or adjusted under 35 U.S.C. 154(b) by 58 days.

(21) Appl. No.: 10/144,329

(22) Filed: May 13, 2002

(65) Prior Publication Data

US 2003/0210737 A1 Nov. 13, 2003

(51) Int. Cl.[7] .......................... H04B 15/00; H04K 1/00; H04L 27/30
(52) U.S. Cl. ....................................... 375/139
(58) Field of Search ................ 375/130, 132, 375/139, 140, 219, 259, 260, 316; 331/60, 187; 455/73

(56) References Cited

U.S. PATENT DOCUMENTS

| | | | |
|---|---|---|---|
| 5,619,531 A | * | 4/1997 | Taylor et al. ............. 375/222 |
| 5,701,328 A | * | 12/1997 | Schuchman et al. ....... 375/139 |
| 5,701,600 A | * | 12/1997 | Wetters et al. ........... 455/208 |
| 5,917,854 A | * | 6/1999 | Taylor et al. ............. 375/222 |
| 6,600,774 B1 | * | 7/2003 | Otto ...................... 375/139 |
| 6,614,813 B1 | * | 9/2003 | Dudley et al. ............ 370/532 |
| 2003/0039300 A1 | * | 2/2003 | Anglin .................... 375/139 |
| 2003/0133496 A1 | * | 7/2003 | Hooton ................... 375/139 |

* cited by examiner

Primary Examiner—Jean B. Corrielus
(74) Attorney, Agent, or Firm—Morrison & Foerster LLP

(57) ABSTRACT

An RF transceiver with a low power chirp acquisition mode includes a pulse detection circuit, which initiates a low power chirp acquisition mode when an appropriate input pulse is received. While in chirp acquisition mode, all transceiver circuitry not required to determine the chirp rate is powered down, a low power fast-hopping LO generator is powered up to provide one or more LO signals to demodulate the incoming signal, and an active bandpass filter connected to filter the demodulated output is arranged to extend the width of its passband to include the chirp rate. The filtered signal is digitized with an ADC and processed to determine the incoming signal's chirp rate. The low power LO generator comprises a look-up table which provides a plurality of digital output word sequences, each of which represents a discrete LO frequency, to a sine-weighted DAC. The resulting varying frequency analog output signal is multiplied to produce the discrete LO signals needed to demodulate the input signal. Once the chirp rate is detected, the low power LO generator is powered down, the passband of the active bandpass filter is narrowed, and the remaining receiver circuitry is powered up to dechirp the RF input signal.

20 Claims, 3 Drawing Sheets

RF TRANSCEIVER WITH LOW POWER CHIRP ACQUISITION MODE

This invention was made with Government support under Contract No. F30602-99-C-0186 awarded by the Department of the Air Force. The Government has certain rights in this invention.

BACKGROUND OF THE INVENTION

1. Field of the Invention

This invention relates to radio frequency (RF) transceivers, and particularly to portable, fast-hopping RF transceivers.

2. Description of the Related Art

Many modern communications systems employ the concept of "frequency hopping", in which the frequency of a transmitted signal is changed at a rapid rate. In some frequency-hopping systems, the rate at which a signal frequency f changes with time t, i.e., $\Delta f/\Delta t$, is defined as a "chirp rate". Data is conveyed in a series of pulses, which can be properly demodulated (or "dechirped") only when the chirp rate is known.

The chirp rate of an incoming RF signal is conventionally determined (referred to herein as "chirp acquisition") using the receiver portion of a transceiver: the incoming signal is mixed with a local oscillator (LO) signal having a frequency which is varied. The resulting intermediate frequency (IF) is processed to detect the LO frequency needed to dechirp the input signal. The incoming RF signals are high frequency, as are the corresponding LO signals needed to detect the chirp rate and to dechirp the input signal. These high frequency LO signals are typically generated with a direct digital synthesizer (DDS) driven with a phase-locked-loop (PLL); as such, there is a significant amount of power associated with the generation of the LO signals. This high power consumption may unacceptably shorten the operational life of battery-powered field transceivers.

SUMMARY OF THE INVENTION

A low power chirp acquisition mode and chirp acquisition method for a fast-hopping RF transceiver are presented which overcome the problems noted above.

The invention provides a low power, fast-hopping LO generator for the chirp acquisition process. Initially, only pulse detection circuitry is powered. When an incoming pulse is detected, a low power chirp acquisition mode is initiated. While in chirp acquisition mode, all transceiver circuitry not required to determine the chirp rate is powered down. A low power fast-hopping LO generator is powered up to provide one or more LO signals to demodulate the incoming signal, and an active bandpass filter connected to filter the demodulated output is arranged to extend the width of its passband to include the chirp rate. The filtered signal is digitized with an analog-to-digital converter (ADC) and processed to determine the incoming signal's chirp rate.

To determine chirp rate, the low power LO generator must generate LO signals having different frequencies. This is preferably accomplished with the use of a look-up table, which produces a plurality of digital output word sequences in a predetermined order in response to a clock signal having a low frequency relative to the chirp rate. Each digital output word sequence represents a respective discrete LO frequency. The digital word sequences are provided to a sine-weighted digital-to-analog converter (DAC) which produces an analog output signal in response, with the frequency of the analog output signal changing with each digital word sequence. The varying frequency analog output signal is multiplied to produce the discrete LO signals provided to the mixers. The ADC and signal processor are also powered during chirp acquisition mode, with the signal processor determining the chirp rate when an LO signal of appropriate frequency is applied to the mixer. Once the chirp rate is detected, the low power LO generator is powered down, the passband of the active bandpass filter is narrowed, and the remaining receiver circuitry is powered up to dechirp the RF input signal.

Further features and advantages of the invention will be apparent to those skilled in the art from the following detailed description, taken together with the accompanying drawings.

DETAILED DESCRIPTION OF THE INVENTION

Figure 1:
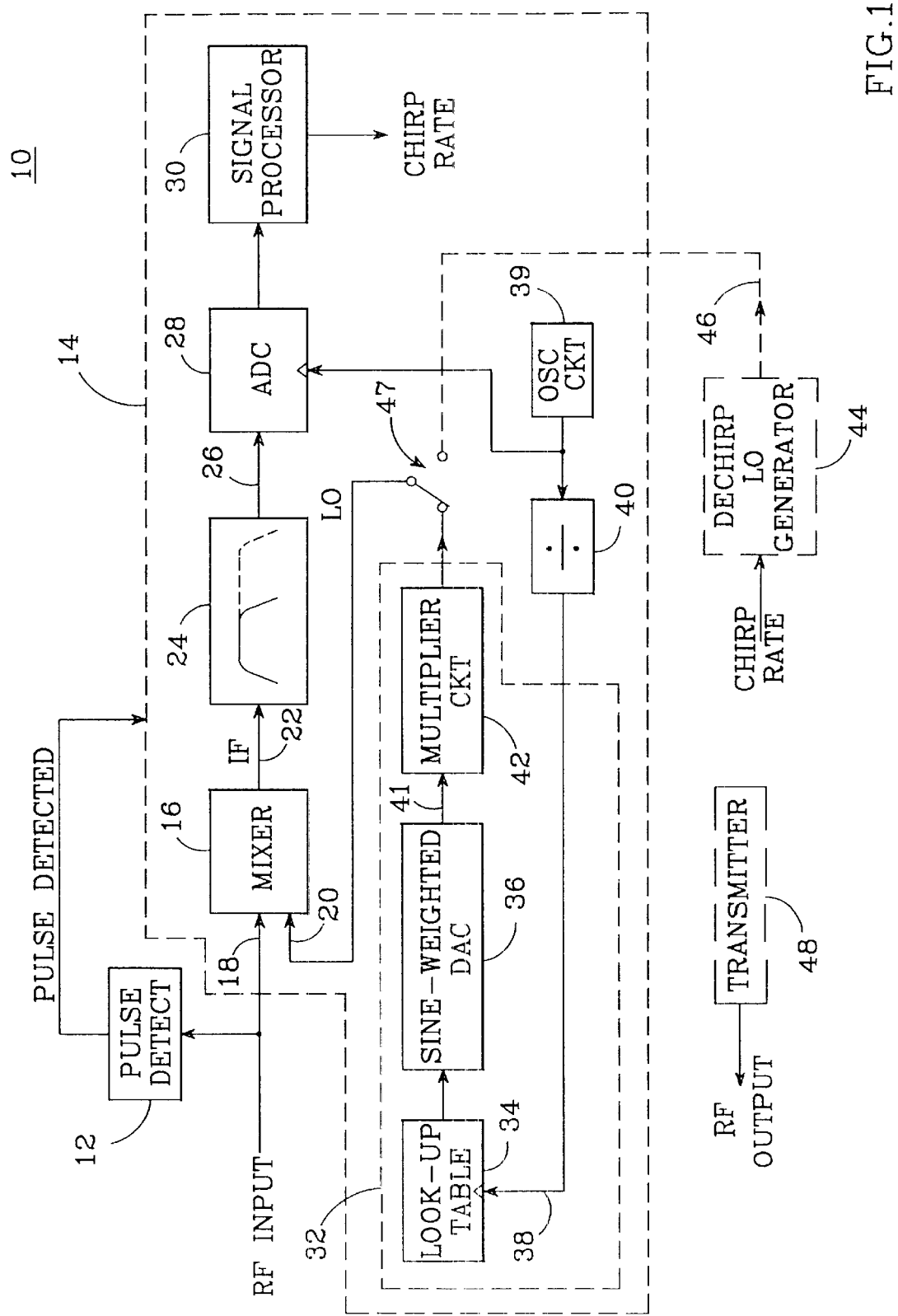
FIG. 1 is a block diagram of one embodiment of an RF transceiver with a low power chirp acquisition mode per the present invention.

The basic principles of a fast-hopping RF transceiver 10 per the present invention are illustrated in FIG. 1. An RF INPUT signal which has an associated chirp rate is connected to a pulse detection circuit 12. The pulse detection circuit 12 is arranged to determine whether incoming pulses are to be received and processed, by ascertaining pulse width and pulse repetition rate, for example, and to initiate a low power chirp acquisition mode when an appropriate pulse is detected. All transceiver circuitry other than pulse detection circuit 12 is powered off prior to receiving an appropriate pulse.

Transceiver 10 also includes a receiver section 14, which is designed to determine the chirp rate of the RF INPUT signal. When the low power chirp acquisition mode is initiated, pulse detection circuit 12 causes receiver section 14 to be powered up, while all other transceiver electronics remain powered down. Receiver section 14 includes a mixer circuit 16 which receives the RF INPUT signal at one input 18 and at least one LO signal at a second input 20, and produces an IF output 22. The IF output is connected to an active bandpass filter 24, and the filtered output 26 is digitized by an analog-to-digital converter (ADC) 28. The digitized output is fed to a signal processing circuit 30 which is arranged to analyze the digitized output and determine the chirp rate of the RF INPUT signal.

Filter 24 is arranged such that it can be configured to provide one of two possible passbands: while in low power chirp acquisition mode, the filter's bandwidth is opened up to one-half the Nyquist rate of the ADC; the passband is narrowed at all other times. The extended bandwidth allows a wide bandwidth to be digitized by the ADC, which simplifies the signal processing circuit's task of determining the chirp rate.

Receiver section 14 includes a low power, fast-hopping LO generating circuit 32, which is only active during the low power chirp acquisition mode. LO generating circuit 32 preferably includes a look-up table 34 which drives a sine-weighted digital-to-analog converter (DAC) 36. Look-up table 34 stores multiple sets of digital word sequences, each of which represents a particular discrete LO frequency. Look-up table 34 is driven with a clock 38 having a relatively low frequency with respect to the chirp rate. Clock 38 is provided by an oscillator circuit 39, the output of which drives ADC 28 and, when divided down by a divider circuit 40, look-up table 34. In response to clock 38, a first digital word sequence is fed to DAC 36 to produce an analog output 41 having a first frequency. After a predetermined time, a second digital word sequence is fed to the DAC to produce an analog output having a second frequency. In this way, the frequency of analog output 41 is stepped through a series of values in a predetermined sequence.

The analog output 41 of DAC 36 is fed to a multiplier circuit 42 to provide the discrete high frequency LO signals needed to demodulate the RF INPUT signal, with the frequency of the generated LO signal varying with the frequency of DAC output 41.

To acquire the chirp rate of the RF INPUT signal, the frequencies of the LO tones provided to mixer circuit 16 should have a minimum spacing equal to the bandwidth of the ADC. To be conservative, it is preferred that these frequency slots overlap. For example, if the bandwidth of the RF INPUT signal is 2.0 GHz, and the bandwidth of the ADC is 0.24 GHz, at least 8 discrete LO tones should be created to determine the chirp rate. With a wider ADC bandwidth, less LO tones are needed, and acquisition time is reduced.

Once the chirp rate is acquired, low power LO generating circuit 32 is powered down, and the receiver circuitry needed to dechirp the RF INPUT signal is powered up. This typically includes a separate "dechirp LO generating circuit" 44, the output 46 of which is connected to mixer 16 (via a switch 47) to provide the LO signals necessary to dechirp the RF INPUT signal. The chirp rate information is stored, preferably digitally, and is used to drive dechirp LO generating circuit 44. The transceiver also includes a transmitter circuit 48, which may also be powered up once the chirp rate is acquired.

Active bandpass filter 24 may be made reconfigurable in several ways. For example, a mux/demux scheme can be used to affect the filter's bandwidth. Here, IF signal 22 is routed to an analog 1:2 demultiplexer circuit which has two separate outputs. One output goes to a wideband active bandpass filter having a bandwidth which is one half the Nyquist rate of ADC 28. The second output goes to a narrowband active bandpass filter having a bandwidth which is a fraction of the ADC's Nyquist rate. The outputs of the two filters go to a 2:1 analog multiplexer, the output of which drives ADC 28. The mux and demux are digitally controlled, and are selected depending on the mode of operation. Similarly, the active filters are powered up and down in accordance with the mode of operation.

An alternative method of making filter 24 reconfigurable would employ a digitally programmable DAC to control the transconductance value of a $g_m/C$ filter.

Figure 2:
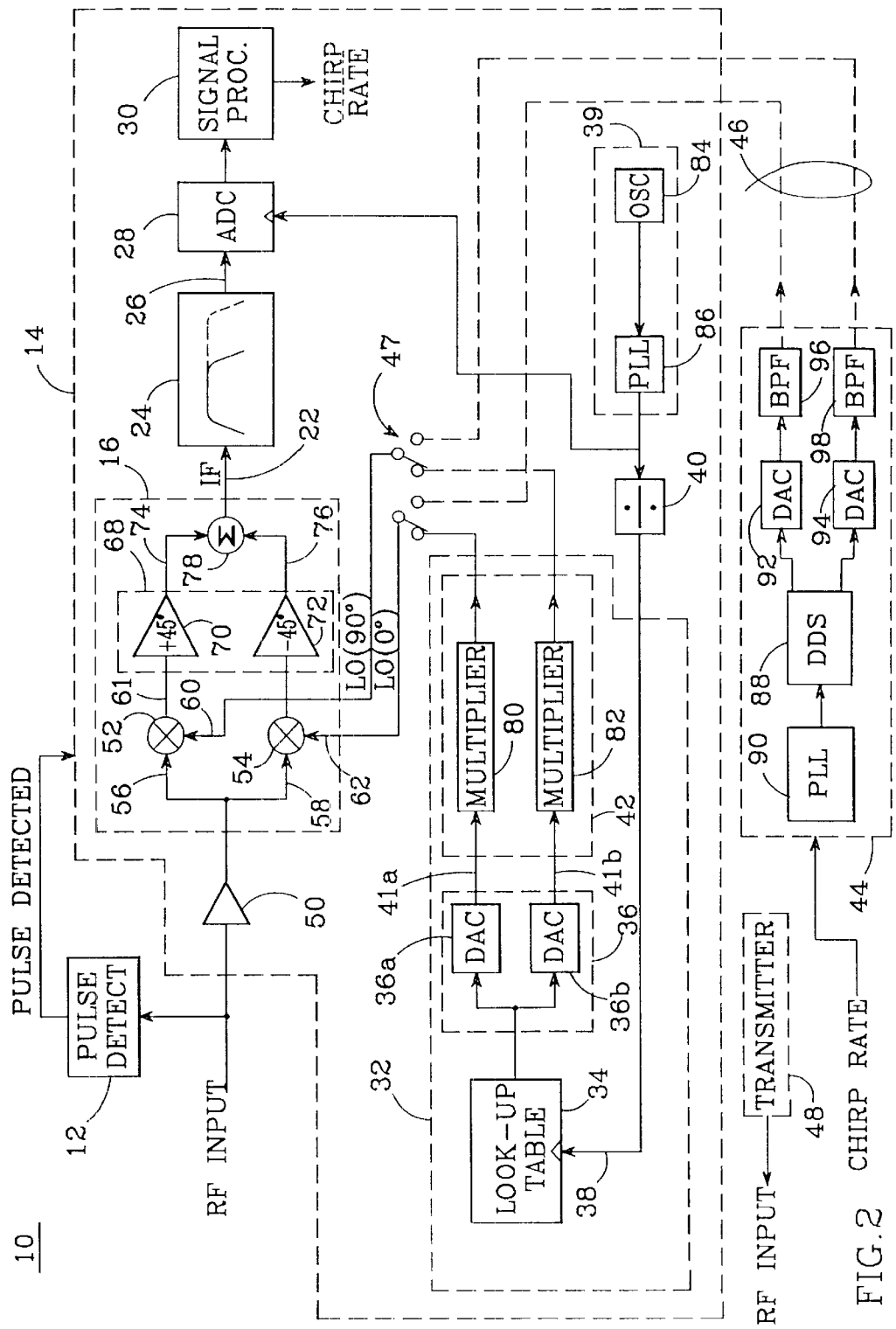
FIG. 2 is a block diagram of another embodiment of an RF transceiver with a low power chirp acquisition mode per the present invention.

Another embodiment of transceiver 10 is shown in FIG. 2. Here, a low noise amplifier (LNA) 50 preferably buffers the incoming RF INPUT signal. Mixer circuit 16 preferably comprises a pair of mixers 52 and 54, preferably Gilbert mixers, which receive the buffered RF INPUT signal at inputs 56 and 58, respectively, and a pair of quadrature LO signals at inputs 60 (90°) and 62 (0°), respectively. Mixers 52 and 54 produce respective outputs 64 and 66, with mixer output 64 containing components of the sum and difference of inputs 56 and 60, and mixer output 66 containing components of the sum and difference of inputs 58 and 62. A phase shift network 68, preferably comprising first and second phase shifters 70 and 72 which introduce +45° and −45° phase shifts into signals 64 and 66, respectively, is connected so as to introduce a 90° phase difference between the mixer outputs. The resulting mixer outputs (74, 76) are summed with a summing circuit 78 to produce IF output 22. The phase shift circuits 70, 72 provide image rejection for the receiver's front-end; one method of implementing this technique to provide active image rejection is described in co-pending patent application Ser. No. 09/220,288, which is assigned to the present assignee. Active image rejection tends to provide more accurate cancellation of the image frequency and is thus preferred; however, passive image rejection techniques may also be employed.

For this embodiment, low power fast-hopping LO generating 32 must generate quadrature LO signals. Multiplier circuit 42 is thus configured to receive the quadrature outputs 41a and 41b of the quadrature sine weighted DACs 36a and 36b, and to generate both the 0° and 90° LO signals in response—using, for example, a pair of properly configured multipliers 80 and 82. Oscillator circuit 39 is preferably implemented with a fixed frequency oscillator 84 driving a PLL circuit 86, which multiplies the oscillator frequency up to the necessary value.

Once the chirp rate has been acquired, dechirp LO generating circuit 44 provides LO signals 46 to mixers 52 and 54, respectively. Circuit 44 preferably includes a direct digital synthesis (DDS) circuit 88 driven by a PLL 90, and a pair of DACs 92 and 94. DDS 88 stores digital word sequences, each of which represents a desired waveform. DDS circuit 88 receives a clock signal from PLL 90, and in response provides respective sequences of digital words to DACs 92 and 94, which in turn produce the 0° and 90° LO signals for mixers 54 and 52, respectively. DDS circuits of this sort are well-known, and are discussed, for example, in *High Speed Design Techniques*, Analog Devices, Inc. (1996), pp. 6-2 to 6-4 and 6-7 to 6-8.

Mixers 52 and 54 are typically designed to receive square wave LO signals. One way to accommodate this is for DDS 88 to store digital word sequences that result in square waves being produced by DACs 92 and 94. Preferably, however, the words stored in DDS 88 are arranged to produce sinusoidal outputs from DACs 92 and 94, which are passed through squaring circuits (not shown) to produce the necessary square waves. The sinusoidal outputs may be band-pass filtered via filters 96 and 98 before they are delivered to the squaring circuits and to mixers 52 and 54.

Figure 3:
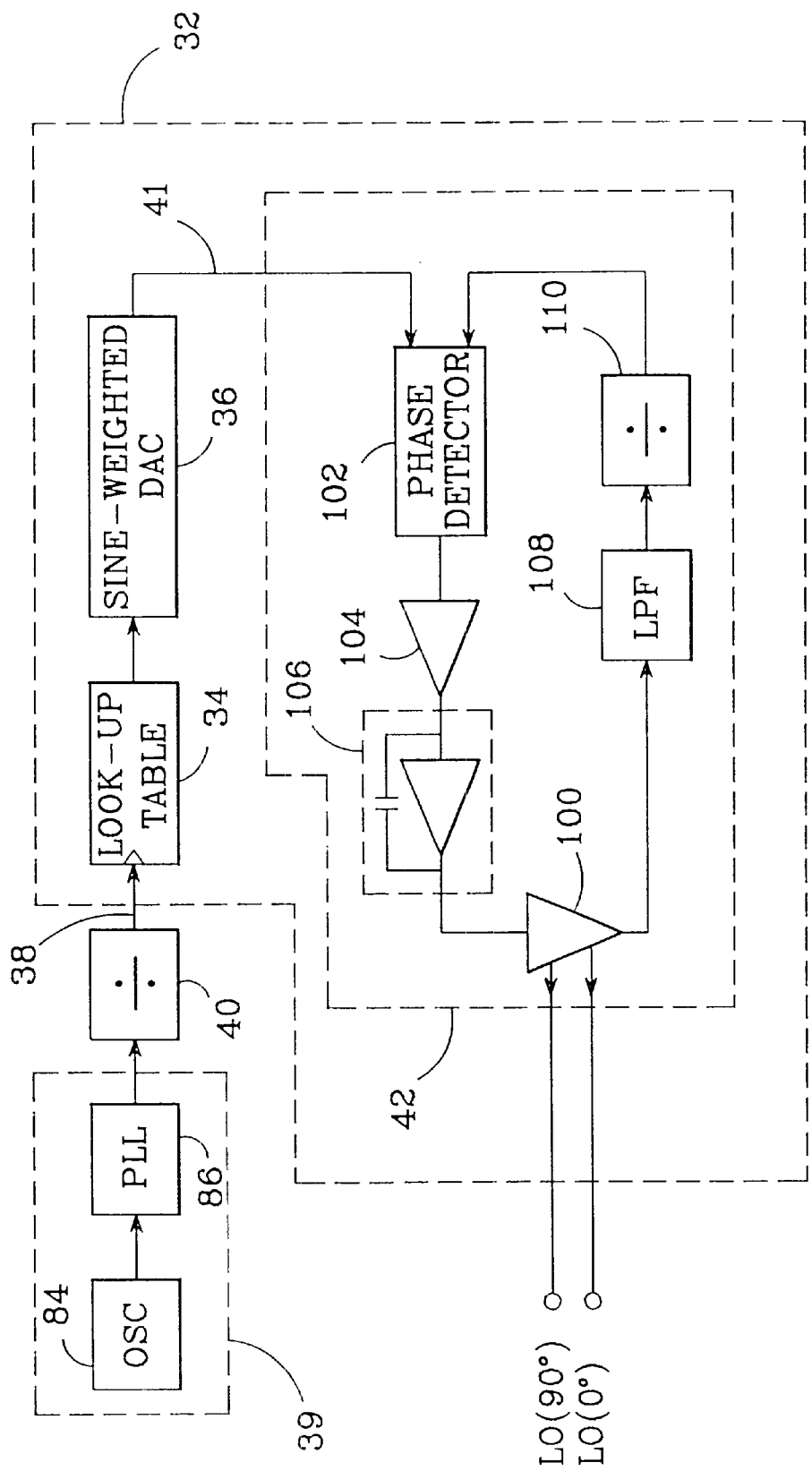
FIG. 3 is a block diagram of one embodiment of a low power fast-hopping LO generation circuit per the present invention.

An alternative implementation of low power fast-hopping LO generating circuit 32 is shown in FIG. 3. As before, clock signal 38 is preferably provided by an oscillator circuit 39 which includes a PLL multiplier 86 driven with a fixed frequency oscillator 84. Look-up table 34 drives sine-weighted DAC 36 to produce an analog output signal 41, which is provided to multiplier circuit 42. Multiplier circuit 42 is here implemented with a PLL which includes a ring oscillator VCO 100 to generate the quadrature LO signals. The PLL typically includes a phase detector 102 driving a charge pump 104 and loop filter 106 into VCO 100, and a low pass filter (LPF) 108 and divider 110 in the feedback loop.

Note that the PLL circuit shown in FIG. 3 is merely exemplary; a wide variety of PLL circuits could be employed to provide the LO signals. Further note that it is not essential that a PLL circuit be used to provide the LO signals; other frequency generating circuits capable of providing highly stable and accurate reference frequencies as required by the application may also be used.

When active image rejection and filtering is employed, the components making up the transceiver front-ends of either FIG. 1 or FIG. 2 can be integrated together on a common substrate. Similarly, the ADC 28 and signal processor 30 can be integrated with the front-end components on a common substrate to provide a complete system-on-a-chip (SOC).

While particular embodiments of the invention have been shown and described, numerous variations and alternate embodiments will occur to those skilled in the art. Accordingly, it is intended that the invention be limited only in terms of the appended claims.

We claim:

1. An RF transceiver with a low power chirp acquisition mode, comprising:
    a pulse detection circuit arranged to detect the presence of an RF pulse within an RF input signal which has an associated chirp rate, and to initiate a low power chirp acquisition mode in response;
    a receiver section which is powered when said transceiver is in said low power chirp acquisition mode, said receiver section comprising:
        a mixer circuit which receives said RF input signal at a first input and at least one local oscillator (LO) signal at one or more additional inputs and which produces an output which includes components derived from the sum of its input signals and from the difference of its input signals;
        an active bandpass filter connected to filter said mixer output, said filter arranged to extend the width of its passband to include said chirp rate while said transceiver is in said low power chirp acquisition mode;
        an analog-to-digital converter (ADC) connected to receive said filtered mixer output at an analog input and to produce a digital output signal in response;
        a signal processing circuit arranged to receive said digital output signal and to determine said chirp rate; and
        an LO generating circuit connected to provide said at least one LO signal to said mixer circuit, said LO generating circuit comprising:
            a look-up table arranged to receive an oscillator signal having a low frequency relative to said chirp rate, and to produce a plurality of digital output word sequences in a predetermined order at an output in response, each of said digital output word sequences representing respective discrete LO frequencies;
            a sine-weighted digital-to-analog converter (DAC) connected to receive said digital output word sequences at a digital input and to produce an analog output signal in response, the frequency of said at least one LO signal varying with the frequency of said analog output signal; and
            a multiplier circuit which receives said analog output signal at an input and produces said at least one LO signal at an output; and
    said transceiver arranged such that circuitry other than said receiver section is powered off when said transceiver is in said low power chirp acquisition mode, said transceiver further arranged to terminate said low power chirp acquisition mode when said chirp rate has been determined.

2. The transceiver of claim 1, wherein said mixer circuit comprises:
    a first mixer which receives said RF input signal at a first input and a first one of said LO signals at a second input, and which produces an output which includes components derived from the sum of its two input signals and from the difference of its two input signals;
    a second mixer which receives said RF input signal at a first input and a second one of said LO signals at a second input, said first and second LO signals having a phase difference of 90° between them, and which produces an output which includes components derived from the sum of its two input signals and from the difference of its two input signals;
    least one phase shift circuit connected in series with at least one of said mixer outputs to introduce a phase difference of 90° between said mixer outputs; and
    a summing circuit which sums said mixer outputs having a phase difference of 90° between them to provide an intermediate frequency (IF) output, said IF output being said mixer circuit output.

3. The transceiver of claim 2, wherein said first and second mixers are Gilbert mixers.

4. The transceiver of claim 2, wherein said at least one phase shift circuit comprises a first phase shift circuit arranged to phase shift the output of said first mixer by +45° and a second phase shift circuit arranged to phase shift the output of said second mixer by −45°, the outputs of said first and second phase shift circuits being summed by said summing circuit to provide said IF output.

5. The transceiver of claim 1, wherein said active bandpass filter is arranged such that its passband is extended to one-half the Nyquist rate of said ADC while said transceiver is in said low power chirp acquisition mode.

6. The transceiver of claim 1, wherein said multiplier circuit comprises one or more frequency multipliers.

7. The transceiver of claim 1, wherein said multiplier circuit comprises a phase-locked loop (PLL) circuit.

8. The transceiver of claim 1, wherein said ADC has an associated bandwidth and said LO generating circuit is arranged such that the minimum spacing between adjacent ones of said plurality of discrete LO frequencies is equal to said ADC bandwidth.

9. The transceiver of claim 1, wherein said active bandpass filter is arranged to reduce the width of its passband as needed to dechirp said RF input signal when said low power chirp rate acquisition mode has been terminated.

10. The transceiver of claim 1, further comprising a low noise amplifier (LNA) connected between said RF input signal and the input of said mixer circuit.

11. The transceiver of claim 1, further comprising a dechirp LO generating circuit connected to provide said at least one LO signal to said mixer circuit when said low power chirp rate acquisition mode has been terminated.

12. The transceiver of claim 11, wherein said dechirp LO generating circuit comprises:
    a direct digital synthesis (DDS) circuit arranged to produce first and second streams of digital word sequences in response to a clock signal, each of said digital word sequences representing an LO signal having a particular frequency;
    a first digital-to-analog converter (DAC) which receives said first stream from said DDS at an input and which produces a first analog output, said first analog output being a first LO signal; and
    a second digital-to-analog converter (DAC) which receives said second stream from said DDS at an input and which produces a second analog output, said second analog output being a second LO signal.

13. The transceiver of claim 1, further comprising an RF transmitter.

14. An RF transceiver with a low power chirp acquisition mode, comprising:
   a pulse detection circuit arranged to detect the presence of an RF pulse within an RF input signal which has an associated chirp rate, and to initiate a low power chirp acquisition mode in response; and
   a receiver section which is powered when said transceiver is in said low power chirp acquisition mode, said receiver section comprising:
      a mixer circuit, comprising:
         a first mixer which receives said R/F input signal at a first input and a first local oscillator (LO) signal at a second input, and which produces an output which includes components derived from the sum of its two input signals and from the difference of its two input signals,
         a second mixer which receives said RF input signal at a first input and a second LO signal at a second input, and which produces an output which includes components derived from the sum of its two input signals and from the difference of its two input signals,
         at least one phase shift circuit connected in series with at least one of said mixer outputs to introduce a phase difference of 90° between said mixer outputs, and
         a summing circuit which sums said mixer outputs having a phase difference of 90° between them to provide an intermediate frequency (IF) output, said IF output being said mixer circuit output;
      an active bandpass filter connected to filter said mixer output, said filter arranged to extend the width of its passband to include said chirp rate while said transceiver is in said low power chirp acquisition mode;
      an analog-to-digital converter (ADC) having an associated bandwidth and connected to receive said filtered mixer output at an analog input and to produce a digital output signal in response;
      a signal processing circuit arranged to receive said digital output and to determine said chirp rate; and
      an LO generating circuit connected to provide said first and second LO signals to said mixer circuit, said LO generating circuit comprising:
         a look-up table arranged to receive an oscillator signal having a low frequency relative to said chirp rate, and to produce a plurality of digital output word sequences in a predetermined order at an output in response, each of said digital output word sequences representing respective discrete LO frequencies;
         a sine-weighted digital-to-analog converter (DAC) connected to receive said digital output word sequences at a digital input and to produce an analog output signal in response, the frequency of said first and second LO signals varying with the frequency of said analog output signal; and
         a multiplier circuit which receives said analog output signal at an input and produces said first and second LO signals at respective outputs;
         said LO generating circuit arranged such that the minimum spacing between adjacent ones of said plurality of discrete LO frequencies is equal to said ADC bandwidth;
      said transceiver arranged such that circuitry other than said receiver section is powered off when said transceiver is in said low power chirp acquisition mode, said transceiver further arranged to terminate said low power chirp acquisition mode when said chirp rate has been determined.

15. The transceiver of claim 14, further comprising a dechirp LO generating circuit connected to provide said first and second LO signals to said mixer circuit when said low power chirp rate acquisition mode has been terminated.

16. The transceiver of claim 15, wherein said dechirp LO generating circuit comprises:
   a direct digital synthesis (DDS) circuit arranged to produce first and second streams of digital word sequences in response to a clock signal, each of said digital word sequences representing an LO signal having a particular frequency;
   a first digital-to-analog converter (DAC) which receives said first stream from said DDS at an input and which produces a first analog output, said first analog output being said first LO signal; and
   a second digital-to-analog converter (DAC) which receives said second stream from said DDS at an input and which produces a second analog output, said second analog output being said second LO signal.

17. The transceiver of claim 14, further comprising an RF transmitter.

18. A method of determining the chirp rate of an RF input signal which has an associated chirp rate, comprising:
   detecting the presence of an RF pulse within an RF input signal which has an associated chirp rate;
   generating at least one local oscillator (LO) signal, by:
      storing a plurality of digital word sequences, each of which represents respective discrete LO frequencies;
      outputting said plurality of digital word sequences in a predetermined sequence; and
      converting said digital word sequences to an analog output signal, the frequency of said at least one LO signal varying with the frequency of said analog output signal;
   mixing said LO signal with said RF input signal to provide an IF output;
   converting said IF output to a digital bit stream; and
   processing said digital bit stream to determine the chirp rate of said RF input signal.

19. The method of claim 18, wherein said determination of said chirp rate is accomplished with circuitry which comprises a portion of a transceiver, further comprising:
   initiating a low power chirp acquisition mode when said RF pulse is detected;
   powering up said transceiver circuitry which determines said chirp rate when said low power chirp acquisition mode is initiated and powering off all remaining transceiver circuitry when said low power chirp acquisition mode is initiated; and
   powering up said remaining transceiver circuitry when said chirp rate is determined.

20. The method of claim 19, further comprising bandpass filtering said IF output prior to its being converted to a digital bit stream, said filtering comprising extending the width of said passband when said low power chirp acquisition mode is initiated and narrowing the width of said passband when said chirp rate is determined.

* * * * *

UNITED STATES PATENT AND TRADEMARK OFFICE
CERTIFICATE OF CORRECTION

PATENT NO. : 6,683,904 B2
DATED : January 27, 2004
INVENTOR(S) : Lloyd F. Linder, Benjamin Felder and Don C. Devendorf It is certified that error appears in the above-identified patent and that said Letters Patent is hereby corrected as shown below:

<u>Title page,</u>
Item [75], Inventors, should read -- Lloyd F. Linder, Agoura Hills, CA (US); Benjamin Felder, Saugus, CA (US); Don C. Devendorf, Carlsbad, CA (US) --

Signed and Sealed this

Twenty-eighth Day of September, 2004

JON W. DUDAS
*Director of the United States Patent and Trademark Office*